(12) United States Patent
Ohkawa et al.

(10) Patent No.: US 7,582,580 B2
(45) Date of Patent: Sep. 1, 2009

(54) OPTICAL GLASS

(75) Inventors: Hiroyuki Ohkawa, Tokyo (JP); Jun Sasai, Tokyo (JP); Naoki Sugimoto, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/195,496

(22) Filed: Aug. 21, 2008

(65) Prior Publication Data

US 2008/0312063 A1 Dec. 18, 2008

Related U.S. Application Data

(63) Continuation of application No. PCT/JP2007/053108, filed on Feb. 20, 2007.

(30) Foreign Application Priority Data

Feb. 21, 2006 (JP) ............................. 2006-044054

(51) Int. Cl.
*C03C 3/15* (2006.01)
*C03C 3/155* (2006.01)
*C03C 3/095* (2006.01)

(52) U.S. Cl. ............................. 501/50; 501/51; 501/64; 501/78

(58) Field of Classification Search ............ 501/50, 501/51, 64, 78
See application file for complete search history.

(56) References Cited

U.S. PATENT DOCUMENTS

| 4,057,435 | A | 11/1977 | Boudot et al. | |
|---|---|---|---|---|
| 5,340,778 | A | 8/1994 | Kloss et al. | |
| 6,495,482 | B1 * | 12/2002 | de Sandro et al. | 501/50 |
| 6,753,278 | B2 * | 6/2004 | Wolff et al. | 501/51 |
| 6,844,279 | B2 * | 1/2005 | Hayashi et al. | 501/50 |
| 2003/0161048 | A1 | 8/2003 | Tsuda et al. | |
| 2005/0188724 | A1 | 9/2005 | Ikenishi et al. | |
| 2008/0312063 | A1 | 12/2008 | Ohkawa et al. | |

FOREIGN PATENT DOCUMENTS

| JP | 52-127908 | 10/1977 |
|---|---|---|
| JP | 60-221338 | 11/1985 |
| JP | 3-37130 | 2/1991 |
| JP | 6-87627 | 3/1994 |
| JP | 9-20530 | 1/1997 |
| JP | 2004-191907 | 7/2004 |
| JP | 2005-154251 | 6/2005 |
| JP | 2005-281124 | 10/2005 |

OTHER PUBLICATIONS

U.S. Appl. No. 12/273,574, filed Nov. 19, 2008, Imakita et al.
U.S. Appl. No. 12/332,589, filed Dec. 11, 2008, Sasai et al.
U.S. Appl. No. 12/110,502, filed Apr. 28, 2008, Ohkawa et al.

* cited by examiner

*Primary Examiner*—Karl E Group
(74) *Attorney, Agent, or Firm*—Oblon, Spivak, McClelland, Maier & Neustadt, P.C.

(57) ABSTRACT

The present invention provides an optical glass including, by mass %: 46 to 70 of $B_2O_3$; 3 to 10 of $Li_2O$; 5 to 15 of $Y_2O_3$; 0 to 46 of $SiO_2$; 0 to 20 of $Al_2O_3$; 0 to 40 of MgO+CaO+SrO+BaO; 0 to 30 of $La_2O_3$; and 0 to 10 of $ZrO_2+TiO_2+Gd_2O_3$.

3 Claims, No Drawings

OPTICAL GLASS

TECHNICAL FIELD

The present invention relates to optical glass in which chemical durability, weather resistance and solubility are excellent having such optical constants that refractive index ($n_d$) is 1.55 to 1.69 and Abbe number ($v_d$) is 55 to 65 and particularly having a softening property at low temperature suitable for a press molding.

BACKGROUND ART

In Patent Document 1, there is a proposal for optical glass containing 23 to 40% by mass of $SiO_2$, 11 to 21% by mass of $B_2O_3$, etc. as optical lens for precise press having medium refractive index, low dispersion and very low softening point where refractive index ($n_d$) is 1.55 to 1.65 and Abbe number ($v_d$) is 54 or more. However, the optical glass of this document is not always satisfactory in weather resistance, solubility, softening property at low temperature, etc.

In Patent Document 1, there is also a description that, when phosphoric acid and boric acid are selected as oxides for the formation of glass, although they are advantageous for lowering the temperature for press molding, problems in chemical durability and weather resistance are apt to happen. Thus, amount of boric acid is made high for making the temperature for press molding low, durability and weather resistance lower corresponding thereto. Therefore, there has been almost no proposal for practical optical glass containing much amount of boric acid component up to now. Patent Document 2 proposes a composition which contains more boric acid component than Patent Document 1 but its optical constants are refractive index ($n_d$) of 1.62 to 1.85 and Abbe number ($v_d$) of 35 to 65 and are substantially different from those which are objects of the present invention.

Patent Document 1: JP-A-03-037130
Patent Document 2: JP-A-60-221338

DISCLOSURE OF THE INVENTION

Problems to be Resolved by the Invention

An object of the present invention is to provide optical glass containing much amount of $B_2O_3$ in which chemical durability, weather resistance and solubility are excellent having such optical constants that refractive index ($n_d$) is 1.55 to 1.69 and Abbe number ($v_d$) is 55 to 65 and being able to conduct a press molding at low temperature.

Means of Solving the Problems

The present inventors have carried out intensive investigations for solving the above-mentioned problems, found that the above object is able to be achieved according to the optical glass as shown below and accomplished the present invention.

(1) An optical glass comprising, by mass %: 46 to 70 of $B_2O_3$; 3 to 10 of $Li_2O$; 5 to 15 of $Y_2O_3$; 0 to 46 of $SiO_2$: 0 to 20 of $Al_2O_3$: 0 to 40 of $MgO+CaO+SrO+BaO$; 0 to 30 of $La_2O_3$; and 0 to 10 of $ZrO_2+TiO_2+Gd_2O_3$.

(2) An optical glass comprising, by mass %: 47 to 65 of $B_2O_3$; 4 to 9 of $Li_2O$; 6 to 12 of $Y_2O_3$; 0 to 25 of $SiO_2$; 0 to 10 of $Al_2O_3$; 0 to 30 of $MgO+CaO+SrO+BaO$; 0 to 20 of $La_2O_3$; and 0 to 5 of $ZrO_2+TiO_2+Gd_2O_3$.

(3) An optical glass comprising, by mass %: 48 to 60 of $B_2O_3$; 5 to 8 of $Li_2O$; 7 to 11 of $Y_2O_3$; 0 to 12 of $SiO_2$; 0 to 5 of $Al_2O_3$; 0 to 25 of $MgO+CaO+SrO+BaO$; 0 to 15 of $La_2O_3$; and 0 to 3 of $ZrO_2+TiO_2+Gd_2O_3$.

Advantageous Effects of the Invention

The optical glass of the present invention (hereinafter, it will be simply referred to as the present glass) has desired refractive index and Abbe number and, as compared with the conventional optical glass of a borate type, it has higher refractive index and lower dispersion. Thus, when they are compared in the same Abbe number, refractive index of the present glass is higher than that of the above-mentioned conventional optical glass to an extent of about 0.01. Further, the present glass has high chemical durability and weather resistance and, on the other hand, it is able to be dissolved at low temperature having a high solubility. In addition, since it is able to be subjected to a press molding at low temperature, durability of a metal mold protective coat formed on the press metal mold, molded surface thereof, etc. is enhanced whereby mass production thereby is excellent. Moreover, since a press molding at low temperature is possible, shortening of a cycle time for the press molding, etc. is possible.

The present glass has the above-mentioned characteristics and, therefore, it is suitable for the production of optical glass, particularly glass lens, by means of a press molding.

BEST MODE FOR CARRYING OUT THE INVENTION

In the present glass, $B_2O_3$, $Li_2O$ and $Y_2O_3$ are essential components. Reasons why the range of each component in the present glass is limited, etc. will be illustrated.

The component $B_2O_3$ is an oxide for the formation of glass and, in the present invention, it is a component which is essential for making the vitrifying range wide and for giving low dispersion. When the amount of $B_2O_3$ is small, the desired optical characteristic is hardly available and, in the present glass, its amount is 46% by mass (hereinafter, it will be just referred to as %) or more. The amount of $B_2O_3$ is preferably 47% or more and, more preferably, 48% or more. On the other hand however, when the amount of $B_2O_3$ is too much, chemical durability is inferior and, therefore, in the present invention, the amount is 70% or less. The amount of $B_2O_3$ is preferably 65% and, more preferably, 60% or less.

$SiO_2$ component is an oxide for the formation of glass like $B_2O_3$. Although it is not a component which is essential in the present glass, it is an effective component for enhancing the chemical durability of the glass while the low dispersion is still kept low. In order to achieve the above effect, amount of $SiO_2$ is preferred to be 0.1% or more. However, when the amount of $SiO_2$ is too much, the desired optical characteristic is hardly available and, at the same time, softening point of glass rises and press molding temperature rises. Therefore, the amount of $SiO_2$ is preferably 46% or less, more preferably 25% or less and, particularly preferably, 12% or less.

$Li_2O$ component is a component which is essential for lowering the glass transition point and for lowering the press molding temperature in the present glass. When the amount of $Li_2O$ is too small, an effect for lowering the press molding temperature is hardly available and, therefore, it is made 3% or more. Amount of $Li_2O$ is preferably 4% or more and, more preferably, 5% or more. When the amount of $Li_2O$ is too much, chemical durability lowers and, therefore, it is made 10% or less. Amount of $Li_2O$ is preferably 9% or less and, more preferably, 8% or less.

Although both $Na_2O$ and $K_2O$ components are not essential components in the present glass, they are the components effective for lowering the glass transition point and for lowering the press molding temperature like $Li_2O$. In order to achieve the above effects, the total amount of $Na_2O$ and $K_2O$ is preferably 0.1% or more. On the other hand, when the total amount of $Na_2O$ and $K_2O$ is too much, chemical durability lowers and, therefore, it is preferably 20% or less, more preferably 10% or less and, particularly preferably, 5% or less.

$Y_2O_3$ component is a component which is essential for enhancing the refractive index without making the dispersion high and also for improving the chemical durability. When the amount of $Y_2O_3$ is too small, the desired optical constants are hardly available and, therefore, it is made 5% or more in the present glass. The amount of $Y_2O_3$ is preferably 6% or more and, more preferably, 7% or more. On the other hand, when the amount of $Y_2O_3$ is too much, dissolving temperature of glass rises and solubility lowers and, therefore, it is made 15% or less in the present glass. The amount of $Y_2O_3$ is preferably 12% or less and, more preferably, 11% or less.

Although $La_2O_3$ component is not a component which is essential for the present glass, it is a component for enhancing the refractive index without making the dispersion high and also for improving the chemical durability like $Y_2O_3$ component. In order to achieve the above effect, it is preferred to make the amount of $La_2O_3$ 0.1% or more. However, when the amount of $La_2O_3$ is too much, dissolving temperature of glass rises and solubility lowers and, therefore, it is preferably 30% or less and, more preferably, 20% or less. When the amount of $La_2O_3$ is 15% or less, it is particularly preferred.

Although $Al_2O_3$ component is not a component which is essential for the present glass, it is effective for improving the chemical durability of the glass. In order to achieve the above effect, it is preferred to make the amount of $Al_2O_3$ 0.1% or more. However, when the amount is too much, the desired optical constants are hardly available and, at the same time, solubility of the glass lowers whereby it is made 20% or less. The amount of $Al_2O_3$ is preferably 10% or less and, more preferably, 5% or less.

Although each of MgO, CaO, SrO and BaO components is not a component which is essential for the present glass, it has an effect of rising a refractive index. In order to achieve the above effect, the amount in terms of their total amount is preferred to be 0.1% or more. On the other hand, when the above total amount is too much, chemical durability lowers and, therefore, the above total amount is preferably 40% or less, more preferably 30% or less and, particularly preferably, 25% or less in the present glass.

Although each of $ZrO_2$, $TiO_2$ and $Gd_2O_3$ components is not a component which is essential for the present glass, it is effective for improving the chemical durability and to prevent devitrification of glass. In order to achieve the above effects, the amount in terms of their total amount is preferred to be 0.1% or more. On the other hand, when the above total amount is too much, Abbe number lowers and high dispersion is resulted and, therefore, the above total amount is preferably 10% or less, more preferably 5% or less and, particularly preferably, 3% or less in the present glass.

Although each of $Ta_2O_5$, $GeO_2$, $Ga_2O_3$, $Nb_2O_5$, $WO_3$ and $TeO_2$ components is not a component which is essential for the present glass, it is a component which is effective rising the refractive index. In order to achieve the above effect, the amount in terms of their total amount is preferred to be 0.1% or more. On the other hand, when the above total amount is too much, Abbe number lowers and high dispersion is resulted and, in addition, each of those components is expensive whereby the above total amount is preferably 10% or less even in case the components are added. The above total amount is more preferably 5% or less and, particularly preferably, 3% or less.

Although $P_2O_5$ component is not a component which is essential for the present glass, it is effective for enhancing Abbe number. In order to achieve the above effect, it is preferred to make the amount of $P_2O_5$ 0.1% or more. On the other hand, when the amount of $P_2O_5$ is too much, chemical durability lowers and vaporization upon dissolving is relatively vigorous whereby the glass having a uniform quality is hardly manufactured. Therefore, the amount of $P_2O_5$ is preferably 20% or less and, more preferably, 15% or less. It is still more preferred when the amount is 10% or less and, when no $P_2O_5$ component is contained in the present glass, it is particularly preferred. The F component also has the same effect, etc. as the $P_2O_5$ component and, therefore, in case it is contained, nearly the same amount is preferred. It is still more preferred when no F component is contained in the present glass.

Although $Sb_2O_3$ component is not a component which is essential for the present glass, it is able to be added as a clarifying agent upon melting of the present glass. When $Sb_2O_3$ is used in the present glass, its amount is preferably 0.1% or more. On the other hand, when the amount is too much, there is a risk of affection on optical characteristic, etc. and, therefore, the amount of $Sb_2O_3$ is preferably 2% or less and, more preferably, 1% or less.

Although ZnO and PbO components are not essential components for the present glass, they are effective for softening the glass. In order to achieve the above effect, it is preferred that the amounts are 0.1% or more in terms of their total amount. On the other hand, in view of environments, the above total amount is preferably 20% or less, more preferably 10% or less, and still more preferably 5% or less. It is particularly preferred that the present glass does not contain ZnO and PbO components.

In accordance with the present glass, it is possible to prepare an optical glass having optical constants where refractive index ($n_d$) is 1.55 to 1.69 and Abbe number ($v_d$) is 55 to 65, being excellent in chemical durability, weather resistance and solubility, being able to subject to a press molding at low temperature and containing much amount of $B_2O_3$. Refractive index of the present glass is preferably 1.60 or more and, more preferably, 1.62 or more.

With regard to Abbe number of the present glass, it is preferably 60 or more and, more preferably, 61.5 or more. With regard to glass transition temperature of the present glass, it is preferably 580° C. or lower and, more preferably, 560° C. or lower.

EXAMPLES

The present invention is now illustrated in greater detail with reference to Examples, but it should be understood that the present invention is not to be construed as being limited thereto.

Examples of the present glass are shown in Table 1. Examples 2 to 16 are the examples of the present glass while Example 1 is a comparative example for the present glass.

[Chemical Composition and Method for Preparing the Samples]

Materials were weighed so as to give the chemical composition (%) as shown in Table 1. The materials used for each of the chemical components are $H_3BO_3$ for $B_2O_3$; $CaCO_3$ for CaO; $SrCO_3$ for SrO; $Li_2CO_3$ for $Li_2O$; and the oxides for $SiO_2$, $Al_2O_3$, $ZrO_2$, MgO, $La_2O_3$, $Y_2O_3$ and $Gd_2O_3$. The weighed materials were subjected to a dry mixing for 30 minutes in a kneader, placed in a platinum crucible having an inner volume of 300 cm³, melted, clarified and stirred at 1,100 to 1,300° C. for 2 to 6 hours, cast in a metal mold in a rectangular shape of 200 mm length and 50 mm width previously heated at about 550° C. and allowed to cool at the rate of about 1° C. per minute to give a sample.

[Method for Evaluation]

The refractive index ($n_d$) is a refractive index to d-line of helium and was measured by a refractive index measurement apparatus (product of Kalnew Optical Industrial Company; trade name: KPR-2). With regard to a measured value of the refractive index ($n_d$), measurement was conducted down to the fifth decimal place and mentioned by rounding off the third decimal place. Abbe number ($v_d$) was calculated from $v_d=(n_d-1)/(n_F-n_C)$. The Abbe number ($v_d$) calculated by that formula was mentioned by rounding off the second decimal place. In the formula, $n_F$ and $n_C$ are refractive indexes for F-line and C-line, respectively, of hydrogen. With regard to glass transition point (Tg), each resulting glass powder was subjected to a measurement at the rising rate of 10° C. per minute by means of differential thermal analysis (DTA) using a thermal analysis apparatus (product of Seiko Instruments; trade name: EXSTAR6000TG/DTA).

With regard to solubility of glass, etc., observation by naked eye was conducted upon manufacture of the above samples and it was confirmed that there was no problem in Examples 2 to 16.

TABLE 1

|  | Ex. 1 | Ex. 2 | Ex. 3 | Ex. 4 | Ex. 5 | Ex. 6 |
| --- | --- | --- | --- | --- | --- | --- |
| $B_2O_3$ | 47.0 | 57.6 | 50.4 | 53.8 | 58.8 | 53.0 |
| $SiO_2$ | 3.0 | 10.8 | 9.5 | 10.1 | 11.1 | 10.0 |
| $Al_2O_3$ | 0.0 | 0.0 | 0.0 | 0.0 | 0.0 | 0.0 |
| $ZrO_2$ | 0.0 | 0.0 | 0.0 | 0.0 | 0.0 | 0.0 |
| MgO | 8.0 | 0.0 | 0.0 | 0.0 | 0.0 | 0.0 |
| CaO | 11.0 | 16.9 | 0.0 | 7.9 | 12.9 | 0.0 |
| SrO | 16.8 | 0.0 | 27.3 | 14.5 | 0.0 | 21.5 |
| $Li_2O$ | 2.2 | 4.5 | 3.9 | 4.2 | 6.9 | 6.2 |
| $La_2O_3$ | 10.0 | 0.0 | 0.0 | 0.0 | 0.0 | 0.0 |
| $Y_2O_3$ | 2.0 | 10.2 | 8.9 | 9.5 | 10.4 | 9.4 |
| $Gd_2O_3$ | 0.0 | 0.0 | 0.0 | 0.0 | 0.0 | 0.0 |
| Refractive Index | 1.63 | 1.60 | 1.61 | 1.61 | 1.60 | 1.60 |
| Abbe number | 60.0 | 62.9 | 63.2 | 62.8 | 62.8 | 63.2 |
| Tg/° C. | 563 | 580 | 576 | 575 | 558 | 558 |

TABLE 2

|  | Ex. 7 | Ex. 8 | Ex. 9 | Ex. 10 | Ex. 11 |
| --- | --- | --- | --- | --- | --- |
| $B_2O_3$ | 54.5 | 48.0 | 55.5 | 50.3 | 50.3 |
| $SiO_2$ | 7.7 | 6.8 | 7.8 | 7.1 | 3.9 |
| $Al_2O_3$ | 0.0 | 0.0 | 0.0 | 0.0 | 0.0 |
| $ZrO_2$ | 0.0 | 0.0 | 0.0 | 0.0 | 0.0 |
| MgO | 0.0 | 0.0 | 0.0 | 0.0 | 0.0 |
| CaO | 16.0 | 0.0 | 12.2 | 0.0 | 14.7 |
| SrO | 0.0 | 26.0 | 0.0 | 20.5 | 0.0 |
| $Li_2O$ | 4.3 | 3.7 | 6.5 | 5.9 | 3.9 |
| $La_2O_3$ | 8.0 | 7.0 | 8.1 | 7.4 | 12.3 |
| $Y_2O_3$ | 9.6 | 8.5 | 9.8 | 8.9 | 14.8 |
| $Gd_2O_3$ | 0.0 | 0.0 | 0.0 | 0.0 | 0.0 |
| Refractive Index | 1.62 | 1.63 | 1.62 | 1.62 | 1.65 |
| Abbe number | 61.5 | 61.8 | 61.8 | 61.6 | 59.8 |
| Tg/° C. | 582 | 578 | 561 | 562 | 582 |

TABLE 3

|  | Ex. 12 | Ex. 13 | Ex. 14 | Ex. 15 | Ex. 16 |
| --- | --- | --- | --- | --- | --- |
| $B_2O_3$ | 52.8 | 48.1 | 48.9 | 48.1 | 57.6 |
| $SiO_2$ | 4.1 | 3.7 | 2.1 | 2.2 | 10.9 |

TABLE 3-continued

|  | Ex. 12 | Ex. 13 | Ex. 14 | Ex. 15 | Ex. 16 |
| --- | --- | --- | --- | --- | --- |
| $Al_2O_3$ | 0.0 | 0.0 | 0.0 | 0.0 | 3.1 |
| $ZrO_2$ | 0.0 | 0.0 | 0.0 | 0.0 | 3.3 |
| MgO | 0.0 | 0.0 | 0.0 | 0.0 | 3.0 |
| CaO | 11.5 | 0.0 | 0.0 | 0.0 | 4.2 |
| SrO | 0.0 | 19.3 | 19.0 | 20.5 | 0.0 |
| $Li_2O$ | 6.0 | 5.5 | 5.4 | 5.8 | 7.6 |
| $La_2O_3$ | 12.7 | 11.6 | 12.4 | 11.6 | 0.0 |
| $Y_2O_3$ | 9.3 | 8.5 | 8.9 | 8.4 | 10.2 |
| $Gd_2O_3$ | 3.6 | 3.3 | 3.3 | 3.3 | 0.0 |
| Refractive Index | 1.64 | 1.64 | 1.64 | 1.64 | 1.59 |
| Abbe number | 60.4 | 60.5 | 60.5 | 60.5 | 61.2 |
| Tg/° C. | 561 | 556 | 555 | 555 | 540 |

While the present invention has been described in detail and with reference to specific embodiments thereof, it will be apparent to one skilled in the art that various changes and modifications can be made therein without departing from the spirit and scope thereof.

The present application is based on Japanese Patent Application No. 2006-044054 filed on Feb. 21, 2006, and the contents thereof are incorporated herein by reference.

INDUSTRIAL APPLICABILITY

In accordance with the present glass, desired refractive index and Abbe number are available and chemical durability and weather resistance are excellent while, at the same time, it is still possible to conduct a press molding at low temperature whereby the solubility is excellent, durability of a metal protective coat formed on press metal mold and on the molded surface thereof and shortening in cycle time upon a press molding are improved and mass productivity is excellent. It is suitable for the manufacture of by a press molding of optical glass and, particularly, glass lens.

The invention claimed is:

1. An optical glass comprising, by mass %:
   46 to 70 of $B_2O_3$;
   3 to 10 of $Li_2O$;
   5 to 15 of $Y_2O_3$;
   0 to 46 of $SiO_2$;
   0 to 20 of $Al_2O_3$;
   0 to 40 of MgO+CaO+SrO+BaO;
   0 to 30 of $La_2O_3$; and
   0 to 10 of $ZrO_2+TiO_2+Gd_2O_3$.

2. An optical glass comprising, by mass %:
   47 to 65 of $B_2O_3$;
   4 to 9 of $Li_2O$;
   6 to 12 of $Y_2O_3$;
   0 to 25 of $SiO_2$;
   0 to 10 of $Al_2O_3$;
   0 to 30 of MgO+CaO+SrO+BaO;
   0 to 20 of $La_2O_3$; and
   0 to 5 of $ZrO_2+TiO_2+Gd_2O_3$.

3. An optical glass comprising, by mass %:
   48 to 60 of $B_2O_3$;
   5 to 8 of $Li_2O$;
   7 to 11 of $Y_2O_3$;
   0 to 12 of $SiO_2$;
   0 to 5 of $Al_2O_3$;
   0 to 25 of MgO+CaO+SrO+BaO;
   0 to 15 of $La_2O_3$; and
   0 to 3 of $ZrO_2+TiO_2+Gd_2O_3$.

* * * * *